United States Patent
Wallbaum et al.

(10) Patent No.: US 11,074,049 B2
(45) Date of Patent: Jul. 27, 2021

(54) METHOD AND SYSTEM FOR GENERATING PROGRAM CODE MODIFIED BY RULE SETS

(71) Applicant: dSPACE digital signal processing and control engineering GmbH, Paderborn (DE)

(72) Inventors: Lars Wallbaum, Paderborn (DE); Wolfgang Trautmann, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 16/230,312

(22) Filed: Dec. 21, 2018

(65) Prior Publication Data

US 2020/0201608 A1 Jun. 25, 2020

(51) Int. Cl.
*G06F 8/35* (2018.01)
*G06F 8/41* (2018.01)
*G06F 8/40* (2018.01)

(52) U.S. Cl.
CPC ............ *G06F 8/35* (2013.01); *G06F 8/40* (2013.01); *G06F 8/41* (2013.01); *G06F 8/443* (2013.01)

(58) Field of Classification Search
None
See application file for complete search history.

(56) References Cited

U.S. PATENT DOCUMENTS

| | | | | |
|---|---|---|---|---|
| 7,367,012 B2 * | 4/2008 | Szpak | ....................... | G06F 8/34 717/105 |
| 8,230,395 B1 * | 7/2012 | Koh | ..................... | G06F 9/44557 717/121 |
| 10,698,674 B2 * | 6/2020 | Gass | ........................ | G06F 8/40 |

OTHER PUBLICATIONS

MathWorks, Target Language Compiler For Use with Real-Time Workshop Reference Guide, Jul. 2002, The MathWorks, Version 5. (Year: 2002).*

* cited by examiner

*Primary Examiner* — Lewis A Bullock, Jr.
*Assistant Examiner* — Mark A Gooray
(74) *Attorney, Agent, or Firm* — Muncy, Geissler, Olds & Lowe, P.C.

(57) ABSTRACT

A computer-implemented method for generating program code based on one or more blocks of a block diagram, at least one block including a block variable. The method comprises opening the block diagram in a model editor, retrieving generation settings for the block variable from a data definition tool, the generation settings comprising a scope of the variable, determining that a modification rule is referenced in the generation settings, and retrieving the referenced modification rule from the data definition tool, wherein a modification rule comprises a filter condition and one or more code changes. A processor generates program code based on the block diagram and the generation settings and applies the referenced modification rule to the block variable in the generated code, which includes verifying that the filter condition is fulfilled for the block variable and applying the code changes to each occurrence of the variable in the code.

14 Claims, 4 Drawing Sheets

METHOD AND SYSTEM FOR GENERATING PROGRAM CODE MODIFIED BY RULE SETS

BACKGROUND OF THE INVENTION

Field of the Invention

The present invention relates to methods and computer systems for automatically generating code from block diagrams, the code preferably being used in electronic control units.

Description of the Background Art

Electronic control units (ECUs) are ubiquitous especially in automotive applications; generally, they may contain a processor, in particular a microcontroller, one or more sensor interfaces and one or more circuits to control an actuator. Current parameters of a physical process are preferably determined using the signals of the one or more sensors connected to the sensor interfaces. Based on a predefined control strategy, the processor may control the one or more circuits to apply the actuators in order to influence the physical process. For example, an ECU may be used to perform anti-lock braking, with a sensor measuring the wheel velocity and a magnetic valve reducing the pressure in the corresponding wheel brakes.

In order to speed up the development process for ECUs, control strategies are preferably developed using block diagrams in a technical computing environment (TCE), such as MATLAB/Simulink of The MathWorks, which allows for tracing the temporal behavior of a physical system described by one or more blocks in the block diagram. The document "Production Quality Code Generation from Simulink Block Diagrams", Proceedings of the 1999 IEEE International Symposium on Computer Aided Control System Design, Kohala-Coast, Hi., USA, by H. Hanselmann et al. describes a system for automatically generating production code based on a block diagram containing one or more blocks that specify the functionality of the program, such as a control program for an ECU that implements the desired control strategy.

Each signal connection between blocks in the block diagram generally results in the generation of a variable in the program code; additionally, each parameter and internal state of a block leads to the generation of a separate variable. For the generation of production quality code, a plurality of properties need to be defined for each variable. Setting properties individually for each variable is very cumbersome; defining generation settings for different classes of variables and assigning a variable class to each variable allows for reducing the effort. However, for large block diagrams with many variables, the number of variable classes that need to be defined grows quickly to become hardly manageable.

Thus, improved methods for generating source code are needed; it would be particularly desirable to provide for a more flexible mechanism to specify variable properties.

SUMMARY OF THE INVENTION

It is therefore an object of the present invention to provide a method and a computer system for automatically generating source code from a block diagram comprising a detailed implementation of the program.

In an exemplary embodiment of the invention, a computer-implemented method for generating program code based on one or more blocks of a block diagram in a technical computing environment is provided. The technical computing environment comprises a model editor, a data definition tool and a code generator and is being executed by at least one processor of a host computer. The inventive method comprises opening the block diagram in the model editor, wherein at least one block comprises a block variable, and retrieving generation settings for the block variable from the data definition tool, the generation settings comprising a scope of the variable.

Once the processor determines that a modification rule is referenced in the generation settings, it retrieves the referenced modification rule from the data definition tool, wherein a modification rule comprises a filter condition and one or more code changes. The inventive method further comprises generating program code based on the block diagram and the generation settings and applying the referenced modification rule to the block variable in the generated code, wherein applying the modification rule comprises verifying that the filter condition is fulfilled for the block variable and applying the one or more code changes to each occurrence of the variable in the code.

The host computer may be realized as a single standard computer comprising a processor, such as a general-purpose microprocessor, a display device and an input device. Alternatively, the host computer system may comprise one or more servers comprising a plurality of processing elements, the servers being connected to a client comprising a display device and an input device via a network. Thus, the technical computing environment may be executed partially or completely on a remote server, such as in a cloud computing setup, so that preferably only a graphical user interface of the technical computing environment is executed locally. The block diagram may comprise multiple blocks with input and/or output signals that are connected to output and/or input signals of other blocks. Each block may be an atomic functional unit or may be a hierarchical block that is composed of a plurality of subordinate blocks.

Advantageously, the inventive method provides for an easy and flexible possibility to set variable properties. The user may choose to set some high-level properties of the variable, such as a scope or whether to initialize the variable at definition, by creating and/or choosing a corresponding generation setting. Further low-level properties of the variable may depend on other parameters; for instance, a type prefix of the variable definition may be chosen based on the width of the variable. By combining a limited set of generation settings and a limited number of modification rules or sets of modification rules, it is easy to set appropriate properties for a considerable number of variables in a block diagram.

In an embodiment, verifying that the filter condition is fulfilled for a variable can comprise determining that a data type of the variable matches a predefined data type and/or determining that a width of the variable matches a predefined width and/or determining that a scope of the variable matches a predefined scope. A code change is only applied when properties of the variable match the defined preconditions. Because the choice whether to apply a code change is performed automatically by a filter condition, the user may define a set of corresponding modification rules and reference these in the generation setting—the right one is automatically chosen.

In an embodiment, the modification rule can be referenced indirectly via a set of corresponding modification rules, wherein the code changes of the corresponding modification rules in the set comprise adding at least one common letter, wherein the filter rules differ for each modification rule in the set. For a set of corresponding modification rules, the code changes such as the added strings are generally similar while differing in detail. The modification rules may be mutually exclusive, so that only one group of code changes is applied to the block variable (or the code remains unchanged).

In an embodiment, a default modification rule or a default set of modification rules may be applied to variables not referencing a modification rule or a set of modification rules. The time and effort required for setting suitable properties for all the variables in a model is significantly reduced.

In an embodiment, the code changes of a modification rule comprise adding a string, the string comprising a name macro and/or a compiler directive, such as a pragma for a C preprocessor. The compiler directive may be specific to a selected compiler and/or it may comprise definition according to a coding standard such as AUTOSAR. For text-based programming languages, adding a string provides multiple possibilities of influencing the code or the compilation either directly or indirectly.

In an embodiment, the code changes comprise adding a name macro, the method further comprising evaluating the name macro, wherein evaluating the name macro comprises adding an identifier based at least partially on properties of the block diagram, such as a hierarchical location of the block in a hierarchical block diagram. In this way, readability of the generated code may be enhanced; the user may easily determine a correspondence between a variable in the code and a block in the diagram even for large models with a plurality of similar blocks.

In an embodiment, a modification rule comprises different code changes for different classes of occurrences of the block variable in the generated code, wherein the classes of occurrences comprise a declaration of the block variable and/or a definition of the block variable and/or a read access to the block variable and/or a write access to the block variable.

While the filter condition refers only to properties of the block variable as such, different occurrences of the variable may require different code changes. This also comprises the possibility that a code change is applied to one kind of occurrence of the variable, but no changes are applied to other kinds of occurrences.

In an embodiment, the code changes for an occurrence of the block variable comprise adding a first string, such as a line of code, before the occurrence and/or adding a second string, such as a line of code, after the occurrence. This allows for enclosing the occurrence of the block variable in brackets, for instance in the form of corresponding preprocessor macros/compiler directives.

In an embodiment, adding a first string before the occurrence of the block variable comprises adding the first string one line before the occurrence and/or before a group of lines comprising the occurrence and wherein adding the second string after the occurrence comprises adding the second string one line after the occurrence and/or after a group of lines comprising the occurrence. This may comprise verifying if a particular code change has already been applied by a previous modification rule and not applying the code change for a second time. For instance, a predefined first string may be added once before a group of variable definitions and/or a second string may be added once after the group of variable definitions.

In an embodiment, the code changes comprise adding a compiler directive indicating a memory section before the definition of the variable, the method further comprising compiling the generated program code and linking object files resulting from the compilation, wherein linking comprises sorting variables according to the indicated memory sections.

A method for programming an electronic control unit is also provided. The method is carried out by at least one processor of a host computer connected to the electronic control unit, wherein a technical computing environment comprising a model editor, a data definition tool and a code generator is installed on the host computer. The method comprises opening the block diagram in the model editor, the block diagram comprising one or more blocks, at least one block comprising a block variable, and retrieving generation settings for the block variable from the data definition tool, the generation settings comprising a scope of the variable. When the processor determines that a modification rule is referenced in the generation settings, it retrieves the referenced modification rule from the data definition tool, wherein a modification rule comprises a filter condition and one or more code changes. The method further comprises generating program code based on the one or more blocks of the block diagram and the generation settings, and applying the referenced modification rule to the variable in the generated code by verifying that the filter condition is fulfilled for the block variable and applying the code changes to the code defining the variable, wherein the code changes comprise adding a compiler directive before the line or the group of lines comprising the variable definition. The host computer then compiles the program code, wherein compiling the program code comprises linking object files and choosing a memory location for the block variable based on the compiler directive, and writes the compiled program code on a non-volatile memory of the electronic control unit.

Advantageously, the inventive method allows for sorting and aligning the variables in a control program, thus resulting in faster access and smaller memory footprint.

The compiler directive may define a memory section for the group of variables. Preferably, variables of one width are grouped together in order to facilitate alignment. A second compiler directive may be added after the group of variables to indicate an end of the list of variables to be placed in that memory section.

An aspect of the invention also concerns a non-transitory computer-readable medium containing instructions that, when executed by a microprocessor of a computer system, cause the computer system to carry out the inventive method as described above or in the appended claims.

A computer system is also provided which comprises a host computer that comprises a processor, a random-access memory, a graphics controller connected to a display, a serial interface connected to at least one human input device, and a nonvolatile memory, in particular a hard disk or a solid-state disk. The nonvolatile memory comprises instructions that, when executed by the processor, cause the computer system to carry out the inventive method. In an embodiment, the computer system further comprises an embedded system connected to the host computer, the embedded system comprising a target processor.

The processor may be a general-purpose microprocessor that is customary used as the central processing unit of a personal computer or it may comprise one or a plurality of processing elements adapted for carrying out specific calculations, such as a graphics-processing unit. In alternative embodiments of the invention, the processor may be replaced or complemented by a programmable logic device, such as a field-programmable gate array, which is configured to provide a defined set of operations and/or may comprise an IP core microprocessor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
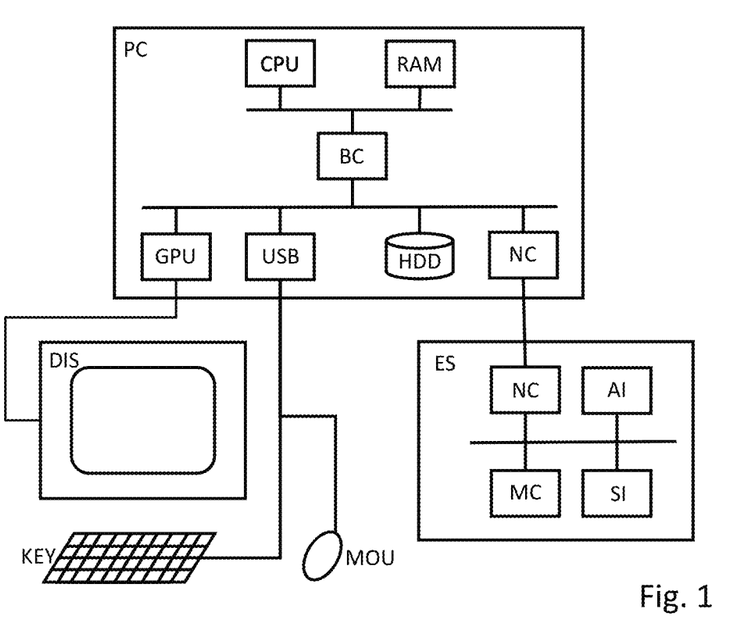
FIG. 1 is an exemplary diagram of a computer system.

FIG. 1 illustrates an exemplary embodiment of a computer system.

The shown embodiment comprises a host computer PC with a display DIS and human interface devices such as a keyboard KEY and a mouse MOU; further, an embedded system ES is depicted, which may e.g. be used for a processor-in-the-loop simulation.

The host computer PC comprises at least one processor CPU with one or multiple cores, a random-access memory RAM and a number of devices connected to a local bus (such as PCI Express), which exchanges data with the CPU via a bus controller BC. The devices comprise e.g. a graphics-processing unit GPU for driving the display, a controller USB for attaching peripherals, a non-volatile memory HDD such as a hard disk or a solid-state disk, and a network interface NC. Preferably, the non-volatile memory comprises instructions that, when executed by one or more cores of the processor CPU, cause the computer system to carry out a method according to one of the claims.

The embedded system ES comprises a network interface NC, an actuator interface AI and a sensor interface SI as well as a microcontroller MC. As an alternative or addition to the microcontroller MC, the embedded system ES may comprise a programmable logic device such as a field-programmable gate array. The programmable logic device may contain a hardwired digital signal processor and it may be configured to comprise an IP core microprocessor. Preferably, the embedded system ES is connected to the personal computer PC via the network interface NC, which may e.g. be of USB, RS-232 or Ethernet type. The embedded system may comprise a non-volatile memory that comprises instructions to be carried out by the microcontroller or a configuration to be loaded on the programmable logic device.

The host computer may comprise one or more servers comprising one or more processing elements, the servers being connected to a client comprising a display device and an input device via a network. Thus, the technical computing environment may be executed partially or completely on a remote server, such as in a cloud computing setup. A personal computer may be used as a client comprising a display device and an input device via a network. Alternatively, a graphical user interface of the technical computing environment may be displayed on a portable computing device, in particular a portable computing device with a touch screen interface.

The computer system may not comprise an embedded system ES. While the embedded system ES is useful for carrying out a processor-in-the-loop simulation of a control program, the presence of an embedded system may not be necessary for carrying out at least some aspects of the present invention.

Figure 2:
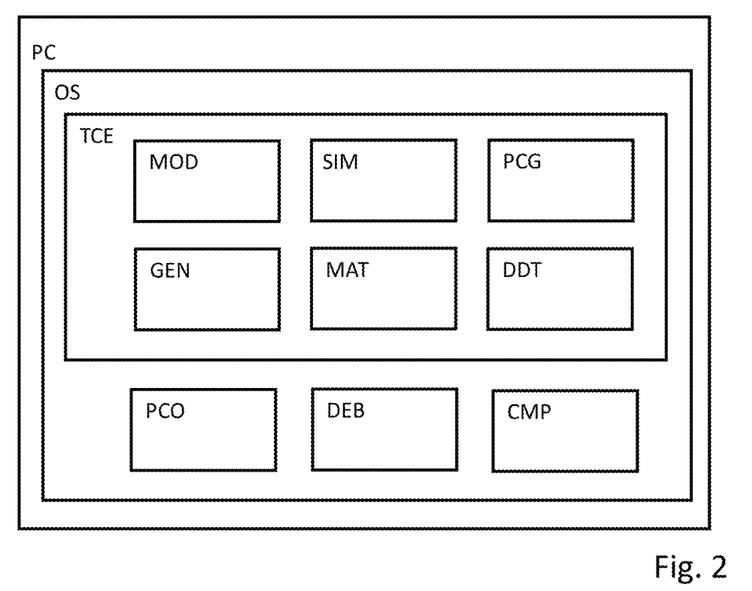
FIG. 2 is an exemplary diagram of software components in a computer system.

FIG. 2 displays an exemplary embodiment of the software components being executed on a computer system, which may be realized as a host computer PC with a standard microprocessor that runs a standard operating system OS such as Microsoft Windows or a Linux distribution.

On the host computer PC, a technical computing environment TCE such as MATLAB/Simulink of The MathWorks may be installed. Other examples of technical computing environments comprise LabVIEW of National Instruments or ASCET of ETAS. The technical computing environment TCE comprises a plurality of software components such as a model editor MOD and a simulation engine SIM. Additionally, the TCE may comprise a mathematical and/or script interpreter MAT that is adapted for carrying out calculations or modifying data. The TCE comprises a production code generator PCG that is adapted to produce production code from a model; further, it comprises a data definition tool DDT and it may comprise a documentation generator. The expression that a software component is comprised in the TCE is intended to encompass the case that the software component uses a specific mechanism of the TCE such as an application-programming interface of the TCE in order to exchange data and/or instructions with other software components in the TCE. For example, a software component may be realized as or comprise an add-on such as a toolbox for the model editor.

The model editor MOD may provide a graphical user interface for creating and modifying block diagrams that preferably describe the temporal behavior of a dynamic system. Additionally, blocks adapted for describing finite states and conditions for transitions between states may be used to model the dynamic system. A block may describe an atomic operation, such as an arithmetic calculation or a logic expression, or it may represent a subsystem that is described in more detail by an additional or partial block diagram in a subordinate hierarchical level. This need not imply that the partial block diagram is stored in a separate file, but rather that the functionality of a hierarchical block is defined by a plurality of blocks in a subordinate level. Alternatively, it may contain code in a higher-level programming language, in particular a dynamic language intended for mathematical programming, that realizes the block's functionality. Multiple blocks may be connected by signals for the exchange of data. For example, an initial block may receive a signal of type single as input signal, may modify the signal e.g. by adding a constant and may send an output signal of type double to a further block. It may be said that the further block is downstream of the initial block because they are connected by a signal path so that data flows from the initial block to the further block.

The simulation engine SIM may be adapted to execute a block diagram created in the model editor MOD in order to observe the temporal behavior of the dynamic system described by the block diagram. The execution of a block diagram may also be called a model-in-the-loop simulation of the dynamic system and is preferably carried out using high-precision operations in order to observe the behavior more closely and to create reference data.

The production code generator PCG allows for creating production code from one or more blocks in a block diagram. Production code may be optimized for readability, traceability, safety, low-energy consumption, execution speed and/or memory requirements. Preferably, the code generator provides a user interface for setting a plurality of options for adapting the customization of the generated code. Customization options may include target-specific optimizations for the microcontroller of the embedded system and enforcing compliance of the generated code to a specific standard, such as the MISRA C guidelines. A particularly preferred production code generator PCG is TargetLink of dSPACE.

The data definition tool DDT provides a local or remote database for storing definitions and parameters as well as an application-programming interface for automatic exchange of the data between different software components. The term "database" is to be understood in a broad sense, so that a file with a tree structure may be considered a database. A data definition tool allows for a clean separation of the model of the dynamic system given in the block diagram from implementation-specific details stored in the database. When a complex model is structured in different sub-models, data in different sub-models may be linked. By storing corresponding information in the data definition tool, these dependencies may be automatically resolved. Additionally, by exchanging data with a software architecture tool, the data definition tool DDT can be used as part of a higher-level tool chain, so as to generate product code compliant to the AUTOSAR standard. A preferred data definition tool is TargetLink Data Dictionary of dSPACE.

A documentation generator GEN may be adapted to traverse the block diagram and generate a documentation based on the definitions in the documentation blocks. The documentation may comprise information from the data definition tool DDT and/or data from external data sources. Other software components such as a production code compiler PCO, a debugger DEB or a comparison tool CMP may also be installed on the computer. These software components may be interfaced to each other and/or the technical computing environment using standard mechanisms of the underlying operating system OS. The compiler PCO may generate an executable for the microprocessor of the PC or it may generate an object code for the microcontroller of the embedded system. Additionally, it may be configured to generate additional debugging information and to include it in the executable. In this way, the debugger DEB can e.g. be used for observing the value of a signal during a software-in-the-loop simulation of the generated production code. Depending on the intended use, the observed values may be directly displayed to the user and/or they may be logged in a memory, e.g. in RAM, in a file or a database.

Figure 3:
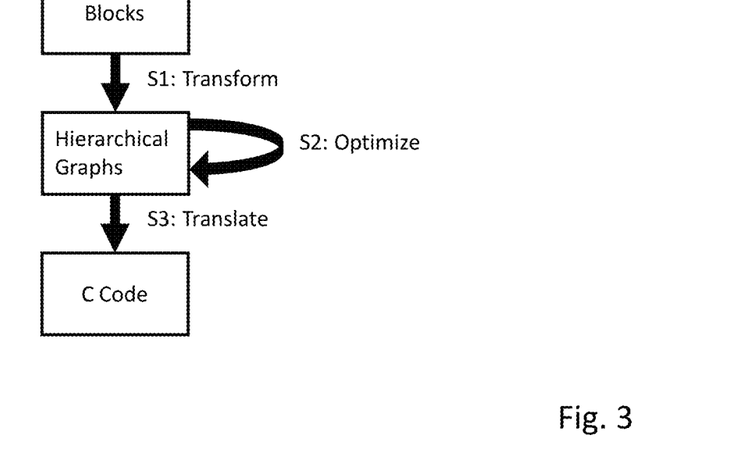
FIG. 3 is an exemplary diagram of a method for generating production code from a block diagram.

FIG. 3 illustrates an exemplary embodiment of the generation of production code from one or more blocks in a block diagram. The following steps are preferably carried out by a microprocessor on the host computer; alternatively, a client server setup may be used so that computationally expensive steps are carried on a remote server containing a plurality of microprocessors.

In a first step S1, the selected one or more blocks (or, if selected, the entire block diagram) and related input data are transformed to an intermediate representation such as one or more hierarchical graphs. These hierarchical graphs may in particular comprise a data flow graph, a control flow graph and/or a tree structure. Related input data may e.g. be extracted from a database associated with the block diagram. This may encompass situations where elements of the block diagram are created based on information from a data definition tool, or where settings relevant for the production code generation are retrieved from the data definition tool.

In a second step S2, the hierarchical graphs are optimized in order to reduce the number of variables required and/or the number of operations or instructions to be carried out. This optimization may comprise a plurality of intermediate steps on further intermediate representations between block level and production code level. In each step, an initial set of hierarchical graphs or an intermediate language is converted to a modified set of hierarchical graphs or an intermediate language while applying one or more optimization rules. A number of strategies such as constant folding or elimination of dead code may be applied during optimization.

In a third step S3, the optimized intermediate representations such as optimized hierarchical graphs are translated to code in a high-level or low-level programming language, preferably C code. The code may be further optimized in this step and restricted to a subset of the linear or parallel programming language, the control and dataflow structures may be restricted to precisely specified variants, the scope of functions and data may be restricted according to accurately specified rules. Alternatively or in addition, additional information may be added to the code, e.g. in the form of comments, to enhance readability or help in debugging the code.

During or after the code generation, information on the current block diagram or the code generation, especially results of the code generation, may again be stored in a database such as the data definition tool. This information may e.g. be used to initialize the simulation engine, to influence a compilation process with a production code compiler, or to export production code information for use in other tools/process, like e.g. calibration and measurement information in ASAP2 format (in particular a variable description file) or AUTOSAR XML information. Preferably, a documentation is generated automatically after production code generation has been finished. In alternative embodiments, hardware-level code or a configuration for a programmable hardware device may be created from the blocks describing the control program.

Figure 4:
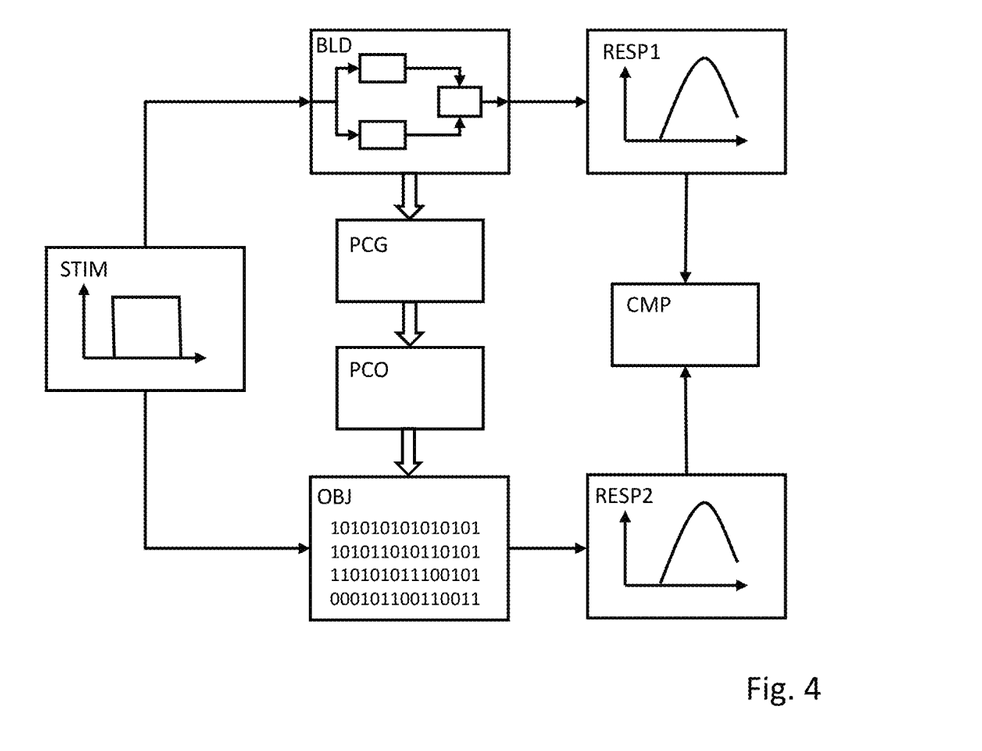
FIG. 4 is an exemplary diagram of a method for testing the compliance of the executable with a model specifying the desired behavior.

FIG. 4 displays an exemplary embodiment of a method for compiling and testing a control program.

The model editor MOD of the TCE preferably comprises a graphical user interface for modifying a block diagram BLD, which may comprise a plurality of blocks interconnected by signal paths. Each block may be an atomic block providing a specific functionality or it may represent a hierarchical block such as a subsystem, which comprise a plurality of subordinate blocks that are shown in a lower hierarchical level. Blocks may be connected by signals which may be of scalar or composite type and which can be represented by arrows indication the direction of the data flow. In the shown example, the block diagram comprises three blocks, an input port for receiving an input signal and an output port for sending an output signal. Preferably, the block diagram describes the predetermined or intended behavior of a control program. Upon activation of the simulation engine in the technical computing environment, the block diagram BLD is executed and results are calculated for each time step. The block diagram may be interpreted directly or it may be converted to an intermediate form that allows for a faster execution in the simulation engine.

Preferably, a number of test cases for the control program have been deduced from the specification and intended application of the control program. Advantageously, a test case comprises a stimulus STIM sent as an input signal to the control program and a corresponding response RESP received as an output signal from the control program. In the shown example, the stimulus STIM is represented by a diagram depicted a particular temporal behavior of the input signal. When the control program is executed in the simulation engine on the host computer, operations corresponding to the block diagram BLD are carried out for a plurality of time steps. During each time step, the current value of the stimulus STIM is fed to the appropriate input ports of the block diagram, the block diagram BLD is being executed in the simulation engine, so that signals are being manipulated and a new internal state of the model may be reached. By simulating the model given in the block diagram for a predetermined duration and by recording the output signal, a response RESP1 can be determined in a model-in-the-loop simulation. A model-in-the-loop simulation mode may be used for verifying that the block diagram executed in the simulation engine accurately describes the intended behavior of the control program. All arithmetic calculations can be carried out with high-precision operations, e.g. using the floating-point data type double for the variables. As a result, the simulation is sufficiently accurate to use the recorded output signals as reference data.

Once correctness of the model has been established and reference data has been stored, the blocks corresponding to the control program are converted to program code via the production code generator PCG. The generated production code is then compiled to object code or an executable using the production code compiler PCO; an object code is binary data that contains instructions for a target processor. When the object code is combined with additional information for the operating system of the host computer, an executable for the host computer is formed. Settings applied during the code generation may comprise a conversion to lower-precision operations that are computationally more efficient, e.g. integer instructions for fixed-point calculations, so that the control program later can be executed in real-time on the microcontroller of an embedded system.

In order to verify that the calculations of the generated code are sufficiently accurate and match the behavior of the blocks in the graphical model, a software-in-the-loop simulation or a processor-in-the-loop simulation may be carried out. The object code or the executable OBJ, which may be in the form of a DLL, contains calculations corresponding to the block diagram. During a predetermined duration, a stimulus STIM is fed to the object code or executable OBJ, and the output signals are recorded to obtain a response RESP2. Generally, multiple variables may be logged while running the simulation; this may comprise adding log macros to the program code prior to the simulation and determine a basic data type of an enumeration signal when initializing the simulation.

The response RESP1 of the model-in-the-loop simulation may be displayed on the host computer simultaneously with the response RESP2 of the generated code, so that a visual comparison may be performed by the user. Additionally or alternatively, the response RESP1 and RESP2 may be compared in a comparison tool CMP, so that a number of checks for compliance to predetermined conditions may be carried out. Preferably, the output signals are compared point by point; in particular, the absolute difference between a data point in RESP1 and the corresponding data point in RESP2 may be calculated. By comparing the differences to a threshold indicating a maximum permissible difference, the correctness of the optimizations applied when generating and compiling the code can be verified.

Figure 5:
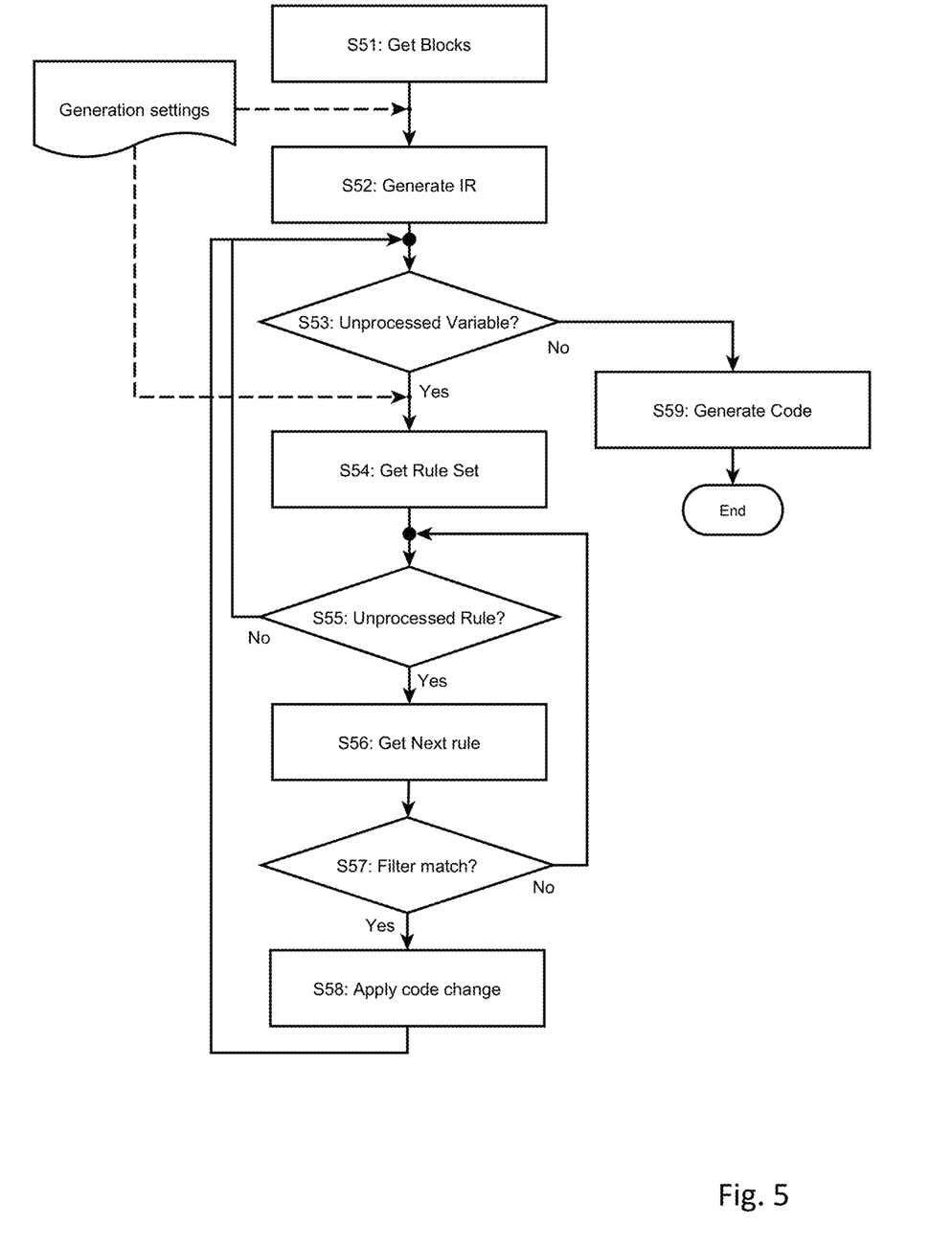
FIG. 5 is a schematic diagram of a method for generating code according to the invention.

FIG. 5 illustrates an embodiment of the inventive method as program flowchart.

In step S51 (Get Blocks), the host computer opens the block diagram selected for code generation in the model editor MOD. Opening the block diagram may encompass determining values of parameters for the model by evaluating expressions in the script interpreter MAT. Further, generation settings for the variables in the block diagram are retrieved from the data definition tool DDT. The generation settings may be assigned to the block variable or default generation settings may be defined for all unassigned variables. Generally, a block diagram may comprise a plurality of block variables, and each block variable may be assigned a different set of generation settings and/or a different modification rule. Thus, each block variable must be considered individually; for simplicity, this can be done sequentially, as will be described in the following. A person skilled in the art will realize that some of the steps of the method may be reordered without departing from the spirit of the present invention. Further, it will be understood that some of the steps may be parallelized for speeding up the code generation, especially for host computers being equipped with multicore processors.

In step S52 (Generate IR), the host computer generates an intermediate representation (IR) of the block diagram, as discussed above in connection with FIG. 3. Generating the intermediate representation may also comprise optimizing the hierarchical diagrams of the IR. Advantageously, no modification rules need to be applied to variables that turn out to be redundant and thus are removed during optimization. Generally, modification rules may be applied both at the end of step S2 as well as in any phase of step S3 in FIG. 3. In the embodiment discussed here, code changes are introduced as nodes in the intermediate representation.

In step S53 (Unprocessed Variable?), a processor of the host computer determines if at least one block variable remains that has not been considered. Otherwise, no further modification rule needs to be applied; execution continues at step S59 (Generate code).

In step S54 (Get Rule set), the processor retrieves the modification rule set referenced in the generation settings for the block variable from the data definition tool DDT. The modification rule set comprises a plurality of corresponding modification rules with similar code changes but different filters.

When it determines in step S55 (Unprocessed rule?) that the modification rule set comprises at least one unprocessed modification rule, the processor continues in step S56 (Get next rule) by retrieving the next modification rule in the rule set. Otherwise, execution continues in step S53 to consider any remaining unprocessed variables.

In step S57 (Filter match?), the processor verifies if the block variable fulfills all filter conditions for the current modification rule. When the filter conditions are in fact fulfilled, the processor applies the code changes of the modification rule in step S58 (apply code changes). The execution continues at step S53 by determining if any variables remain that need to be processed. When the filter condition is false, no code change is applied. The execution continues at step S55 by determining if any unprocessed modification rule remains in the set. Advantageously, the modification rules in the set are processed sequentially until the filter conditions are fulfilled; only the code changes of that modification rule are applied in step S58 and execution continues by processing the next variable. Applying the code changes may comprise applying a code change to one kind of occurrence (e.g. write) of the variable while leaving a different kind of occurrence (e.g. read) of the variable unchanged.

In step S59 (Generate code), the processor generates code for the block diagram comprising the block variable. Because code changes are applied post-optimization, this allows for applying optimizations directly to a group of blocks and to concentrate code for multiple blocks in a single line. The generated code may be written to a file (or a plurality of files) before finishing execution of the inventive method.

Figure 6:
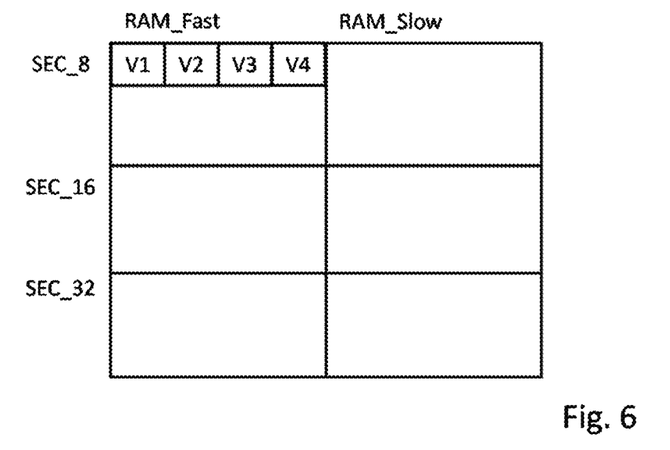
FIG. 6 is a schematic diagram of the memory organization of an exemplary microcontroller.

FIG. 6 is a schematic diagram illustrating the organization of the random-access memory (RAM) of an exemplary microcontroller in an electronic control unit. For simplicity, any non-volatile memory that may also be comprised in the ECU is not depicted.

In the shown example, the RAM includes two separate regions, that may be situated on two different chips in the ECU; for instance, the microcontroller may comprise a limited quantity of fast RAM, and a dedicated memory chip that is larger but slower may additionally be present on the ECU. The user may choose which variables to store in the fast RAM and which variables to store in the slow; this high-level decision may be reflected in the generation settings for the variable, RAM_Fast or RAM_Slow.

Additionally, variables of the same width may be grouped together in order to avoid aliasing of the memory or slower access due to misalignment. The choice of memory section based on the width of the variable is a low-level decision that can be made automatically for a plurality of variables. The RAM is divided in a number of sections comprising the sections SEC_32 dedicated to 32-Bit variables, SEC_16 dedicated to 16-Bit variables and Sec_8 dedicated to 8-Bit variables. As an example, four 8-Bit variables V1, V2, V3 and V4 are shown in the SEC_8 memory section.

Figure 7:
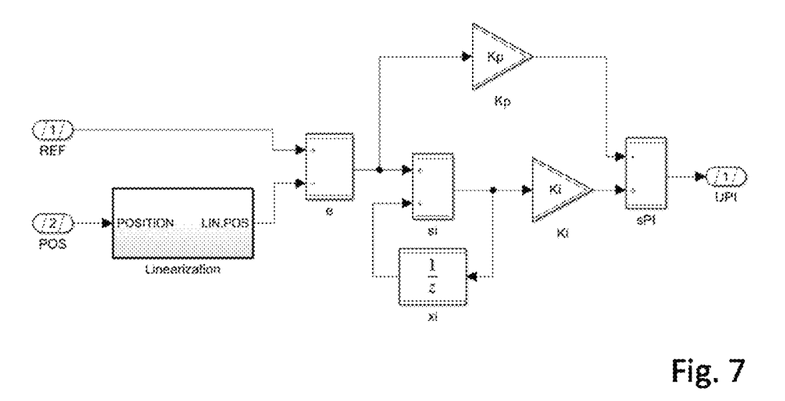
FIG. 7 is an exemplary block diagram of a control program.

FIG. 7 displays an exemplary block diagram of a control program.

A first input port receives a reference position REF and a second input port receives a measured position POS. A subsystem Linearization receives the measured position and converts it to a linearized position. For simplicity, details of the linearization subsystem are not shown. In a subtraction block, the difference e between the reference position and the reference position is calculated. The calculated difference e is transmitted to a first gain block Kp and an addition block si. The output signal si of the addition block is connected to its second input port via delay block (1/z) xi. The output signal si of the addition block is also transmitted to a second gain block Ki. Both the first gain block Kp and the second gain block Ki are connected to a further addition block sPi. The result of the addition is transmitted to an output port UPI. In order to generate production code from the block diagram, detailed generation settings need to be applied to the variables and blocks.

Exemplary code generation settings for a variable are listed in table 1; these settings are applicable e.g. for a code generation in the C programming language. In this example, the settings are grouped together and assigned a variable class such as CAL; the field Description contains a string describing the variable class. Parameters defined in the generation settings may comprise a scope of the variable (such as global), whether or not the variable is volatile and/or const and/or is to be initialized at the definition of the variable in the program code. In a parameter info, access possibilities to the variable for a calibration and measurement system may be defined (such as read, write or both). The variable class may also comprise parameters concerning an optimization of the variable by the production code generator; for instance, a setting of movable may indicate that the variable may be moved in a conditional control flow of the program code. Further, a property ModificationRule-Set_Ref allows for referencing a set of modification rules (here "Rom").

TABLE 1

| | |
|---|---|
| Variable class | CAL |
| Description | global calibratable parameters (ROM) |
| Scope | global |
| Volatile | on |
| Const | on |
| Init at Definition | on |
| Info | readwrite |
| Optimization | MOVABLE |
| ModificationRuleSet_Ref | Rom |

An example for a modification rule is listed in table 2; both the filter rule (Filter) and the code changes to be applied (Settings) are given. The modification rule may be part of a modification rule set that comprises corresponding modification rules with similar settings but e.g. filters for different width of the variables. The shown filter rule comprises two conditions, a first condition for the width and a second condition for the scope of the block variable. According to the first condition (WidthSpec), the code changes should only be applied to variables with a width of 8 Bit (APPLY_TO_8BIT). According to the second condition (ScopeSpec), the code changes should only be applied when the scope of the variable is global (APPLY_TO_GLOBAL) or static global (APPLY_TO_STATIC_GLOBAL). When all filter rules are fulfilled, the code changes defined by the Settings are to be applied. In the shown example, the fields PreDefinitionStatement and PostDefinitionStatement allow for defining code changes one line before and one line after the definition of the variable. Leaving these fields empty indicated that no code changes are to be applied directly proximate to the variable. The fields PreDefinitionBlockStatement and PostDefinitionBlockStatement allow for defining code changes before a group of variable definitions comprising the variable referencing the modification rule. In the shown example, the group of adjacent variable definitions is enclosed in a pragma for defining a memory section and a pragma for restoring the previous settings. For other occurrences of the variable (such as read/write access) no code changes are applied.

TABLE 2

| Filter | |
|---|---|
| WidthSpec | APPLY_TO_8BIT |
| ScopeSpec | APPLY_TO_GLOBAL, APPLY_TO_STATIC_GLOBAL |
| Settings | |
| PreDefinitionStatement | |
| PostDefinitionStatement | |
| PreDefinitionBlockStatement | #pragma section="ROM_8BIT" |
| PostDefinitionBlockStatement | #pragma section restore |

In listing 1, production code generated from the model in FIG. 7 is given. The variables are grouped together according to their width. In addition to the modification rule discussed above, a default modification rule has been applied to global variables with a width of 16 Bit.

All global variables of the program code are enclosed in compiler directives defining a memory section. In the shown example, variables of 16 Bit width are in a different memory section than variables of 8 Bit width. This allows for creating different memory sections and grouping the variables according to width when compiling and linking the generated program code.

Those skilled in the art will appreciate that the order of at least some of the steps of the inventive method may be changed without departing from the scope of the claimed invention. While the present invention has been described with respect to a limited number of embodiments, those skilled in the art will appreciate numerous modifications and variations therefrom. It is intended that the appended claims cover all such modifications and variations as fall within the true spirit and scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

```
Listing 1:
    #include "Table_Lookup.h"
    #pragma section = "DATA_16BIT"
    /* DISP: global observable variables (RAM)| Width: 16 */
    Int16 SPI; /* controller output signal */
    /* GLOBAL_INTERFACE: mergeable global variables (RAM)| Width: 16 */
    Int16 Position; /* measured position */
    Int16 Reference; /* reference position */
    Int16 UPI; /* Controller Output */
    static Int16 LinPosition; /* linearized position */
    #pragma section restore
    #pragma section="ROM_8BIT"
    /* CAL: global calibratable parameters (ROM)| Width: 8 */
    const volatile Int8 LinTable[25] =
    {/* [0..9] */ -96, -94, -91, -87, -81, -74, -66, -56, -46, -35,
        /* [10..19] */ -24, -12, 0, 12, 24, 35, 46, 56, 66, 74,
        /* [20..24] */ 81, 87, 91, 94, 96 }; /* linearized output */
    /* STATIC_CAL: static calibratable parameters (ROM) | Width: 8 */
    static const volatile Bool LinEnableLUT = 1; /*enable lookup */
    static const volatile UInt8 LinGain = 85; /* for small signals */
    #pragma section restore
    void Controller(void)
    {
        Int16 SCtrl1_e;
        static Int16 X_SCtrl1_xi = 0;
        Linearization( );
        /* e */
        SCtrl1_e = (Int16) (Reference - LinPosition);
        /* si c.w. xi */
        X_SCtrl1_xi = (Int16) (((Int16) (SCtrl1_e >> 1)) + X_SCtrl1_xi);
        /* sPI c.w. Ki c.w. Kp c.w. xi */
        SPI = (Int16) (SCtrl1_e + ((Int16) ((((Int32) X_SCtrl1_xi) *
            13107) >> 16)));
        /* outport: UPI */
        UPI = SPI;
    }
    static void Linearization(void)
    {
        if ((Position >= 3072) && LinEnableLUT) {
            LinPosition = (Int16) (((Int16) Table_Lookup(25,
                (const Int8*) &(LinTable[0]), 3, -96, (Int8)
                (Position >> 7))) << 7);
        }
        else {
            LinPosition = (Int16) ((((Int32) Position) *
                ((Int32) LinGain)) >> 7);
        }
    }
```

What is claimed is:

1. A method for generating program code based on one or more blocks of a block diagram in a technical computing environment, the technical computing environment comprising a model editor, a data definition tool and a code generator, the technical computing environment being executed by at least one processor of a host computer, the method comprising:
   opening the block diagram in the model editor, the block diagram having at least one block comprising a block variable, the block diagram comprising a first block variable and a second block variable;
   retrieving generation settings for each block variable in the block diagram including the first block variable and the second block variable from the data definition tool, the generation settings comprising a scope of the variable;
   determining for each block variable in the block diagram whether a modification rule set is referenced in the generation settings for the block variable, wherein each of the first block variable and the second block variable reference a modification rule set;
   retrieving each referenced modification rule set of the first block variable and the second block variable from the data definition tool, the modification rule set comprising a plurality of corresponding modification rules that each comprise a filter condition and one or more code changes, the corresponding modification rules comprising different filter conditions and similar code changes, wherein a default modification rule is applied to variables not referencing a modification rule or a modification rule set;
   generating program code based on the block diagram and the generation settings by generating an intermediate representation of the block diagram, applying at least one optimization to the intermediate representation and translating the optimized intermediate representation to the program code in a programming language;
   applying, for each block variable that references a modification rule set, the referenced modification rule set to the block variable in the generated program code, wherein applying the referenced modification rule set comprises sequentially applying unprocessed modification rules in the modification rule set until a filter condition of one modification rule is fulfilled for the block variable or no unprocessed modification rules remain in the modification rule set, wherein applying a modification rule comprises verifying that the filter condition of that modification rule is fulfilled for the block variable and applying the one or more code changes of that modification rule to each occurrence of the variable in the generated program code to form modified program code; and
   compiling the modified program code.

2. The method of claim 1, wherein verifying that the filter condition is fulfilled for a variable comprises determining that a data type of the variable includes at least one of matching a predefined data type, determining that a width of the variable matches a predefined width, and determining that a scope of the variable matches a predefined scope.

3. The method of claim 1, wherein the code changes of the modification rule in the modification rule set comprise adding at least one common letter, wherein the filter conditions differ for each modification rule in the modification rule set.

4. The method of claim 1, wherein high-level properties of a variable, including a scope or whether to initialize the variable, are selected by a user by creating or choosing a corresponding generation setting, and
   wherein low-level properties of the variable depending on parameters, including a width of the variable, are set via the modification rule.

5. The method of claim 1, wherein the code changes of the modification rule comprise adding a string, the string comprising at least one of a name macro, and a compiler directive, including a pragma for a C preprocessor.

6. The method of claim 5, further comprising evaluating the name macro, wherein evaluating the name macro comprises adding an identifier based at least partially on properties of the block diagram, including a hierarchical location of the block in a hierarchical block diagram.

7. The method of claim 1, wherein the modification rule comprises different code changes for different classes of occurrences of the block variable in the generated code, wherein the classes of occurrences comprise at least any one of a declaration of the block variable, a definition of the block variable, a read access to the block variable, and a write access to the block variable.

8. The method of claim 1, wherein the code changes for an occurrence of the block variable comprise adding at least one of a first string, including a line of code, before the occurrence and adding a second string, including a line of code, after the occurrence.

9. The method of claim 8, wherein adding a first string before the occurrence of the block variable comprises at least one of adding the first string one line before the occurrence and before a group of lines comprising the occurrence and wherein adding the second string after the occurrence comprises at least one of adding the second string one line after the occurrence and after a group of lines comprising the occurrence.

10. The method of claim 1, wherein the code changes comprise adding a compiler directive indicating a memory section before the definition of the variable, the method further comprising compiling the generated program code and linking object files resulting from the compilation, wherein linking comprises sorting variables according to the indicated memory sections.

11. A non-transitory computer readable medium containing instructions that, when executed by a microprocessor of a computer system, cause the computer system to carry out the method according to claim 1.

12. A method for programming an electronic control unit, the method being carried out by at least one processor of a host computer connected to the electronic control unit, a technical computing environment comprising a model editor, a data definition tool and a code generator being installed on the host computer, the method comprising
   opening the block diagram in the model editor, the block diagram comprising one or more blocks, at least one block comprising a block variable, the block diagram comprising a first block variable and a second block variable;
   retrieving generation settings for each block variable in the block diagram from the data definition tool, the generation settings comprising a scope of the variable;
   determining for each block variable in the block diagram whether a modification rule set is referenced in the generation settings for the block variable, wherein each of the first block variable and the second block variable reference a modification rule set;

retrieving each referenced modification rule set of the first block variable and the second block variable from the data definition tool, the modification rule set comprising a plurality of corresponding modification rules that each comprise a filter condition and one or more code changes, the corresponding modification rules comprising different filter conditions and similar code changes, wherein a default modification rule is applied to variables not referencing a modification rule or a modification rule set;

generating program code based on the one or more blocks of the block diagram and the generation settings by generating an intermediate representation of the block diagram, applying at least one optimization to the intermediate representation and translating the optimized intermediate representation to the program code in a programming language;

applying, for each block variable that references a modification rule set, the referenced modification rule set to the block variable in the generated program code, wherein applying the referenced modification rule set comprises sequentially applying unprocessed modification rules in the modification rule set until a filter condition of one modification rule is fulfilled for the block variable or no unprocessed modification rules remain in the modification rule set, wherein applying a modification rule comprises verifying that the filter condition of that modification rule is fulfilled for the block variable and applying the code changes of that modification rule to the generated program code defining the block variable forming modified program code, wherein the code changes comprise adding a compiler directive;

compiling the modified program code, wherein compiling the modified program code comprises linking object files and choosing a memory location for the block variable based on the compiler directive; and writing the compiled program code on a non-volatile memory of the electronic control unit.

13. A computer system comprising:

a host computer, the host computer comprising a microprocessor, a random access memory, a graphics controller connected to a display, a serial interface connected to at least one human input device, and a nonvolatile memory, in particular a hard disk or solid state disk, the nonvolatile memory comprising instructions that, when executed by the microprocessor, cause the computer system to carry out the method according to claim 1.

14. The computer system of claim 13, further comprising an embedded system connected to the host computer, the embedded system comprising a target processor.

* * * * *